United States Patent
Buck

[11] Patent Number: 5,571,298
[45] Date of Patent: Nov. 5, 1996

[54] REGENERATABLE FILTER FOR COMBUSTIBLE PARTICLES, PARTICULARLY SOOT FILTER

[76] Inventor: Alfred Buck, Nagolder Strasse 32 D-72108, Nagold, Germany

[21] Appl. No.: 512,776

[22] Filed: Aug. 9, 1995

Related U.S. Application Data

[63] Continuation of Ser. No. 200,645, Feb. 23, 1994, abandoned.

[30] Foreign Application Priority Data

Feb. 26, 1993 [DE] Germany .................... 43 05 915.5

[51] Int. Cl.⁶ .................................................. B01D 29/62
[52] U.S. Cl. ........................ 55/267; 55/282; 55/301; 55/DIG. 10; 55/DIG. 30; 60/295; 60/311; 422/174
[58] Field of Search .................... 55/282, 267, 523, 55/527, 525, 301, DIG. 5, DIG. 30, DIG. 10, 268, 269, 385.3; 60/295, 300, 311; 422/174; 95/283, 288

[56] References Cited

U.S. PATENT DOCUMENTS

| | | | |
|---|---|---|---|
| 4,544,388 | 10/1985 | Rao et al. | 55/282 |
| 4,813,231 | 3/1989 | Bykowski | 55/523 X |
| 4,829,766 | 5/1989 | Henkel | 55/523 X |
| 4,878,928 | 11/1989 | Wagner et al. | 55/282 X |
| 4,913,712 | 4/1990 | Gabathuler et al. | 55/523 X |
| 4,940,476 | 7/1990 | Buck | 55/486 |
| 5,053,062 | 10/1991 | Barris et al. | 55/282 |
| 5,141,714 | 8/1992 | Obuchi et al. | 422/174 |
| 5,258,164 | 11/1993 | Bloom et al. | 422/174 |

FOREIGN PATENT DOCUMENTS

| | | |
|---|---|---|
| 0275372A1 | 7/1988 | European Pat. Off. . |
| 0358522A2 | 3/1990 | European Pat. Off. . |
| 3807539A1 | 9/1989 | Germany . |

Primary Examiner—Richard L. Chiesa
Attorney, Agent, or Firm—Frishauf, Holtz, Goodman, Langer & Chick

[57] ABSTRACT

To prevent damage to an electrical resistance heater (13–16) which, when energized by electrical energy, for example in the order of 100 A at 12–24 V, a heat reservoir substance is included in the filter, positioned in heat transfer relation to the electrical resistance heater (13–16) and located, with respect to the flow direction of the gas stream through the filter, upstream of the filter material (15). Preferably, the electrical resistance heater is a perforated, tubular sheet-metal structure, axial ends of which are electrically connectable by connecting bolts (21, 25) to an electrical energy supply. The heat reservoir substance (14) is either wrapped at the outside over the tubular resistance heater (13–16), applied as a layer (14a) at the inside of the tubular resistance heater, or filled into the hollow interior thereof in form of a wire wool (14b). This substantially increases the heat transfer or heat exchange surface between the resistance heater and gases flowing therethrough, thus decreasing required electrical heating energy and protecting the resistance heater (13–16) against overheating upon variations in gas flow when the heater is energized. A typical heater temperature is 1300° C., and it is, for example, made of sheet metal of 22% chromium, 4.8% aluminum, the remainder iron; the filter material preferably includes mineral fibers and metal wire; the heat reservoir substance (14) can be Inconel (Reg. TM) wire, preferably knitted.

24 Claims, 2 Drawing Sheets

REGENERATABLE FILTER FOR COMBUSTIBLE PARTICLES, PARTICULARLY SOOT FILTER

This application is a Continuation of application Ser. No. 08/200,645, filed Feb. 23, 1994, abandoned.

Reference to related patent, the disclosure of which is hereby incorporated by reference, by the inventor hereof: U.S. Pat. No. 4,940,476, Buck, patented Jul. 10, 1990.

Reference to related disclosure: German DE 38 07 539 A1, Voelskow.

FIELD OF THE INVENTION

The present invention relates to a regeneratable filter for combustible particles, particularly a soot filter especially adapted to trap carbon particles in the exhaust from Diesel engines, and especially to an arrangement which permits regenerating the filter by burning off the particles with a high-temperature electrical resistance element.

BACKGROUND

The referenced U.S. Pat. No. 4,940,476, Buck, the inventor hereof, describes a filter especially adapted to clean exhaust gases from Diesel engines. A housing is provided in which a support element is located on which the filter material is secured. The support element is a perforated tube, closed at one end. The exhaust gases are guided radially through the tube and hence through the filter material. The filter material is a textile structure formed of knitted mineral fibers. Use of mineral fibers has the advantage that they can readily accept the high temperature in the exhaust gas from internal combustion engines. Using a knitted fabric, rather than a woven fabric, has the advantage that the filter material is self-supporting and is not shifted in position due to variations in the flow of exhaust gases, and particularly pulses and intermittent rapid oscillations in the flow, endemic in the exhaust gases from internal combustion engines.

Filters of this type eventually become clogged by carbon particles which deposit on the filter material.

It is known to clean soot from various surfaces, and also from a filter of this type, by burning off the accumulated carbon particles. Excess oxygen, usually present in the exhaust gases, is used for the combustion. The temperature within the filter must be increased substantially in order to obtain such combustion. It has been proposed to heat the exhaust gases by passing them past an electrical heating element, through which a current in the order of about 120 A is passed, at voltages between 12 to 24 V. Merely heating the exhaust gases by a constant heat supplying element involves dangers, however, since the hot gases may then reach a temperature which is so high that the resistance heating element itself is endangered. The quantity of exhaust gases varies over time, and particularly when coming from Diesel engines, is subject to peaks and pulses. If the gas stream is not sufficiently strong to remove the heat from the resistance heating element, hot spots may occur which cause destruction of the heating element itself.

THE INVENTION

It is an object to provide a regenerating filter for gases containing combustible particles, typically soot, and in which the particles can be burned out from the filter without endangering the resistance heating element, while still providing temperatures sufficiently high to obtain regeneration of the filter.

Briefly, the filter has a housing through which gases are introduced axially, then flow radially, and through a gas-pervious filter material which is high temperature resistant. The filter material is secured to a tubular support structure which, in accordance with a preferred embodiment of the invention, itself forms the electrical resistance heating element. By forming the tubular support structure with a plurality of holes, through which the gases can escape radially, the overall electrical resistance of this perforated tube, from one axial end to the other, can be sufficiently high so that the tube itself will form a resistance heating element. The electrical resistance heating element is positioned, with respect to the flow direction of the gas stream through the filter, upstream of the filter material, and a heat transfer and reservoir or heat sink arrangement is located in the housing, in heat transfer relation with respect to the electrical resistance element, positioned in flow direction of the gas stream through the filter, upstream of the filter material.

Use of a heat transfer material which is in thermal and physical contact with the resistance heating element causes heating of the transfer material by the heating element and by the exhaust gases. Heat transfer surfaces are substantially increased to affect the heat transfer from the heating element to the gases. This greatly increased heat exchange surface permits reliably achieving the combustion temperatures necessary for burning off the combustible particles upon heating the heating element. The heating element, itself, can operate at lower temperatures than heating elements in accordance with the prior art. It is well protected against burning-out if the stream of gases should decrease in intensity. The transfer and heat reservoir substance, which is formed by a heat transfer material, has a certain thermal inertia and, therefore, can temporarily store heat from the exhaust gases or from the electrical resistance heating element if, for example, there are substantial variations in flow of the gas stream carrying the particles. This reliably prevent excessive temperature rise of the heating element into a temperature range which might damage the heating element itself.

In accordance with a preferred arrangement, which is particularly space-efficient, the support structure for the filter material can be used simultaneously as the resistance heating element.

Usually, all materials which are good conductors of heat are also good electrical conductors. In accordance with a feature of the invention, the heat transfer material is electrically insulated from the heating element, while still maintaining good thermal heat transfer and thermal contact. This eliminates possible short-circuiting of the resistance heating element by the heat transfer material; the resistance heating element is fully effective since only the resistance element is subjected to electrical current.

In accordance with another feature of the invention, which results in particularly good current distribution through the tubular heating element, the tubular heating element is not formed as a closed cylindrical structure but, rather, is formed with an axial gap extending parallel to the outer surface of the tube, or facing edges are electrically insulated from each other. This can easily be constructed by rolling a flat sheet-metal element in such a way that the edges do not touch or overlap but, rather, form a small gap.

In accordance with yet another feature of the invention, the heat reservoir material or substance acts also as a heat transfer arrangement and is located between the electrical resistance heating element and the filter material as such. It is also possible, in another arrangement, to locate the heat reservoir substance in advance of the resistance heater, with respect to the flow direction of the gas stream.

Preferably, the heat transfer material is formed of a textile material which provides a large effective surface. Such textile materials, which are essentially planar, are formed with materials of high heat conductivity, for example of high heat resistant metal fibers or filaments or the like. A textile structure of this type can be formed as a metal wire wool, loosely filled into the resistance heating tube, or applied as a layer on the inside, or around the outside of the tubular resistance heating element.

When the heat transfer and reservoir substance is formed by a heat transfer material, which is wrapped around the outer surface of the tube for example, it is desirable to form the substance as a randomly placed fibrous metal, or as a woven structure or as a knitted structure. Knitted structures have advantages, since the individual fibers or strands, due to the formation of interlocking loops, have self-supporting characteristics and cannot be shifted by impingement by the gas and variations in gas flow. Knitted material has the additional advantage that it can fit snugly against any surface, since it is elastic in all directions. It is also possible, however, to fit flat textile structures loosely into, or around the tubular resistance heating element.

The textile material which forms the filter material is preferably rolled into rings which are slid over the tubular resistance heating element. The rings can be fitted, for example, over the heat reservoir or heat transfer layer.

Additional heat transfer capability is obtained if the filter material includes not only ceramic or fiberglass but also some metallic strands or fibers, so that the filter material as such is a mixture knitted of metallic and ceramic fibers at the same time.

DETAILED DESCRIPTION OF THE PREFERRED EMBODIMENTS

Figure 1:
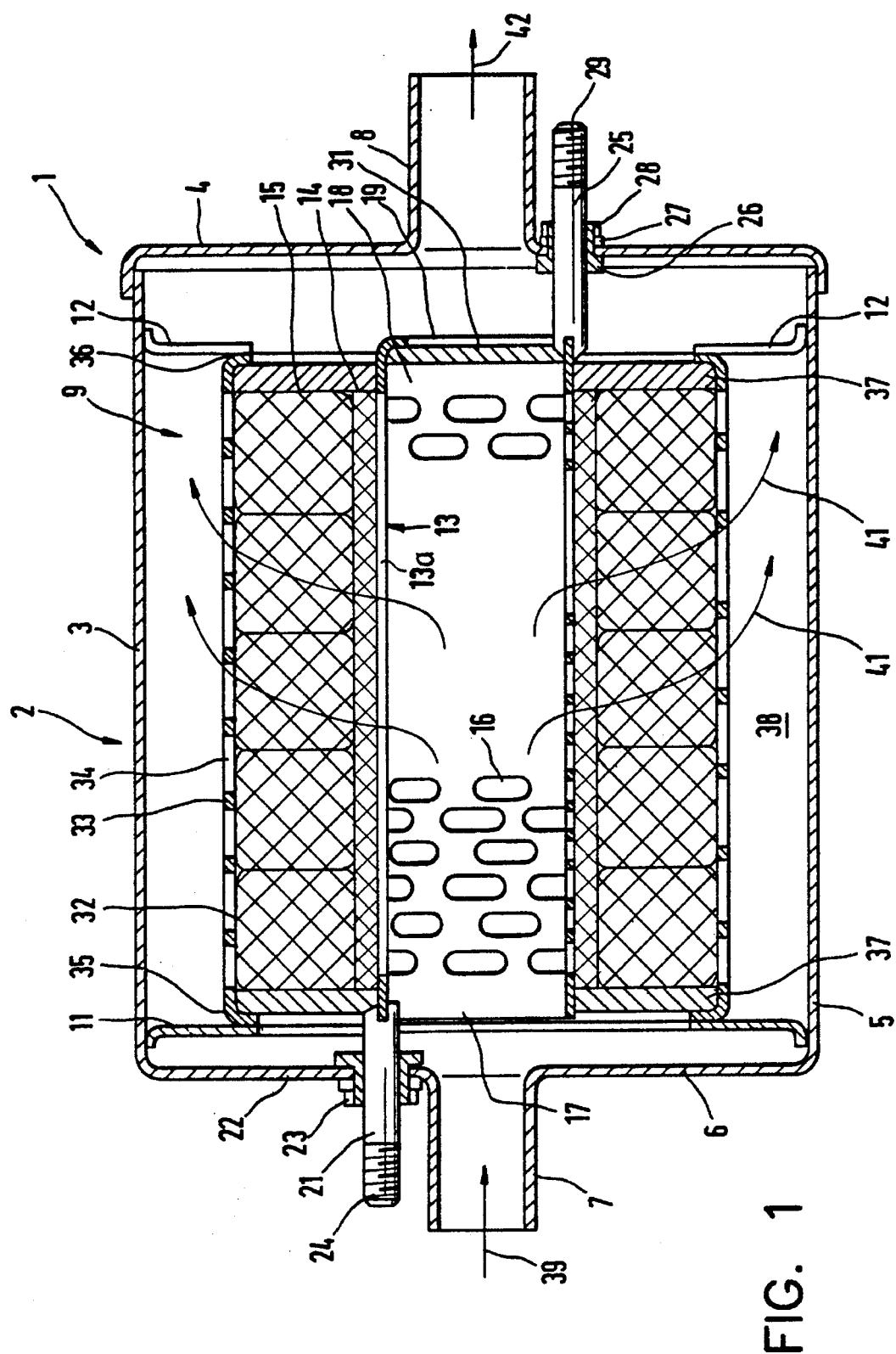
FIG. 1 is a highly schematic longitudinal cross-sectional view through a filter in accordance with the present invention.

For purposes of illustration, the invention will be described in connection with a filter adapted to be coupled to the exhaust system of a Diesel engine. The filter 1 of FIG. 1 has an outer housing 2 which is formed of a cup-shaped or pot-shaped element 3 with a cover 4 secured thereto. The cup-shaped or pot-shaped element 3 is a unitary structure and includes an essentially cylindrical outer wall 5, unitary with a bottom portion 6. An inlet stub or connector 7 is located in the bottom portion 6, coaxial to the wall 5.

The cover 4 is gas-tightly seated on the outer wall 5 of the pot-shaped portion 3 and is formed with a gas outlet stub or connector 8.

A filter cartridge 9 is located within the housing 2. It is axially arranged and secured to the housing by a ring-shaped disk 11, located close to the bottom 6 and, at the axially remote end, retained by a plurality of radially extending spokes or spider strips 12, secured in the vicinity of the cover 4 to the wall 5.

The filter is arranged for gas flow in the direction shown by the arrows 39 and 42. The filter has a filter support structure 13. In accordance with a feature of the present invention, the structure 13 simultaneously forms a resistance heating element. A heat retention and heat transfer material 14 is located between structure 13 and filter material 15. Filter material 15 is tightly packed in ring-shaped elements, and forms the filter body as such.

In accordance with a feature of the present invention, the combined support structure—resistance heater element 13 is a sheet-metal structure bent into a tube which, over its entire length, is formed with a plurality of uniformly distributed elongated holes 16, the longer axes of which extend in circumferential direction of the heating tube 13. The heating tube is not perforated at the axial end portions 17 and 18. The end portion 18 is formed with a radially inwardly bent end region or edge 19. The end portion 17, at the left side of FIG. 1, which is the upstream side, is straight. The sheet-metal element forming the resistance heater 13, in circumferential direction, is not a closed tube but, rather, in the direction of the outer surface or jacket of the heater tube, the edges are spaced from each other, as seen at 13a in FIG. 1. Thus, considered circumferentially, the tube is somewhat resilient, so that dimensional changes which arise due to temperature changes to which the filter is subjected can be readily accepted. Suitably, the resistance heating arrangement 13–16 is formed of sheet metal made of 22% chromium, 4.8% aluminum, the remainder iron.

A threaded bolt 21 is electrically conductively secured to the unperforated end portion 17, and conducted through an insulating bushing 22, fitted in the bottom 6 of the housing to the outside. A counter nut 23 is screwed on the bushing 22 at the outside thereof. The bolt 21 extends parallel to the axis of the tubular structure and parallel to the inlet stub or connector 7, somewhat radially offset therefrom. The outer end is formed with a thread; the region within the bushing 22 is cylindrically smooth, so that the passage will be airtight, while permitting some longitudinal movement upon changes in dimension due to heating of the structure.

A similar bolt 25 is located at the gas outlet end of the filter carried outside of the filter through an insulated bushing 26 passing through a bore 27 in the cover 4. Bushing 26 is retained in position by a counter nut 28. The bolt 25 is gas-tightly located in the respective bushing 26, and longitudinally movable, for a limited distance, to be able to accept thermally caused changes in length of the filter structure.

The bolt 25 is threaded at its end by a thread 29. Bolts 21 and 25 provide attachment bolts to maintain the filter cartridge 9 and the entire filter 1 in position and, further, provide electrical terminals for external supply of electrical energy to the resistance heating element 13–16. They are dimensioned to carry heavy currents, for example of 100 amperes and well over 100 amperes, at voltages of, for example, between 12 to 24 V.

A closure plate 31 is held in position by the inwardly turned end portion 19 to force a stream of gas axially introduced into the tube 13 to be deflected in radial direction through the hole 16.

In accordance with a feature of the invention, the heat transfer material 14 surrounds the resistance heating element 13–16 in the region between the unperforated end portions 17, 18; it may overlap the unperforated end portions 17, 18. This heat transfer material 14, also forming a heat transfer substance, is provided in order to increase the surface with which the electrical resistance heating element 13 provides heat to the gas flowing therethrough, and thus affect the heat transfer from heating element 13 to the gas. The heat transfer material 14 is formed of a flat textile structure, and preferably a knitted wire mesh, in form of a knitted structure the threads of which are formed by a wire, preferably an Inconel (Reg. TM) wire. Preferably, the wire has a diameter of between about 0.15 to 0.23 mm. The knitted stitches or loops have a width of, for example, about 6 mm. A plurality of layers of this knitted fabric are wound over the resistance heating tube 13 until the thickness of the heat reservoir and heat transfer substance 14, measured in radial direction, is between about 4–5 mm.

Use of knitted fabric has the substantial advantage that the flat textile structure has sufficient inherent stability due to the formation of the knitted loops. This stability prevents shift of individual wire fibers with respect to each other when subjected to a pulsating gas stream. Such pulsating gas streams have the tendency to form holes in other fabrics at localized positions, thus interfering with the effectiveness of the heat reservoir and heat transfer substance 14. Additionally, knitted fabrics can be stretched in mutually perpendicular direction. Thus, changes in length of portions of the wires forming the knitted fabric, arising upon changes in operating temperature, can be easily accepted by a flat textile structure. Knitted loops of the kind used result in loops which have a bent portion and an elongated portion. The fabric can be stretched both in the direction of the bent portion of the loops as well as of the elongated portions, in view of the knitted structure.

A knitted structure is preferred; other structures may be used, for example a randomly located felted-type structure, if requirements on inherent stability are not too high. The reservoir and/or heat transfer structure 14, however, should have good thermal contact with the outside of the resistance heating element 13–16.

The heat reservoir and heat transfer structure 14 can be wound around the resistance heating element 13–16. In such an arrangement, the outside of the structure 14 is essentially cylindrical, and hence coaxial with respect to the housing 2. Filter material 15 is located at the outside of the heat retention, heat reservoir or heat transfer structure 14. Preferably, the filter material 15 is assembled in individual rings 32. Each ring 32, itself, forms a portion of a tubular knitted fabric of mineral fibers. The tubular portions are rolled to form the rings 32, shirred or pleated or spiraled. For a detailed description, reference is made to U.S. Pat. No. 4,940,476, Buck, the inventor hereof.

A pleated structure can be formed by compressing a knitted tube in axial direction so that, looked at in cross section, adjacent pleats are formed, similar to an accordion. In a spiral arrangement, a tubular knitted structure is flattened, and then once folded longitudinally. This, then, will be a four-layer or four-ply knitted ribbon. This four-ply ribbon is wound into a ring 32, by winding it on edge.

When a pleated or shirred arrangement is used, the longitudinal portions of the knitted loops are generally radially located with respect to the resistance heating element 13. If the spiral or edge wound arrangement is selected, the longitudinal portions of the knitted loops are circumferentially located. Both arrangements have the advantage with respect to a rolled-on or wound-on filter material that the rows and courses of the knitted loops in the knitted fabrics are located in generally well-ordered alignment, so that the filter effect is enhanced.

The individual rings 32 are axially compressed in order to prevent passage of gases through the filter without being effectively filtered by the material of the filter 15. Looked at in cross section, the knitted filter rings are compressed to a generally rectangular body—see FIG. 1. The rings 13 are surrounded at the outside by a tube 33, which is formed with a plurality of holes 34. The tube 34 is turned over inwardly at the end portions and essentially gas-tight ring-shaped terminal disks 37 retain the filter rings 32 in position within the tube 33. The rings 32, thus, are compressed axially by the disks 37. The rings 37 additionally form terminal ends for the layers of the heat reservoir or heat transfer material 14.

The outer tube 33 of the filter cartridge 9 is gas-tightly connected at its edge 35 with the disk 11, as described above; the turned-over edge 36 is connected to the individual spokes or spider elements 13, and hence held in position within the wall 5 of the cup-shaped portion 3 of the housing. The inner diameter of the tube 33 is substantially smaller than the clear diameter of the cup or pot-shaped portion 3, to define a ring space 38 which is coupled to the gas outlet stub or connector 8 to permit gas flow therefrom.

Operation

Gas to be filtered, for example exhaust gas from a Diesel engine, which carries along soot, is conducted to the inlet stub or coupling 7, in the inlet direction shown by arrow 39. The gas flows into the interior of the tubular resistance heating element 13–16. The holes 16 of the structure 13–16 permit the gas to escape radially outwardly, as shown by arrows 41, through the heat retention or heat reservoir or heat transfer structure 14. The gas then passes through the filter material 15. Gas from the filter material 15, now devoid of soot, passes through the holes 34 of the outer tube 33 into the ring space 38. The ring space 38 is closed off with respect to the inlet stub and the bottom 6 by the disk 11, so that gas can escape only in the direction of the cover 4 and then towards the outlet connector 8, where the gas flows out in the direction of the arrow 42. Gas cannot pass from the inlet connector 7 directly into the ring space 38, being blocked by the disk 11. Flow in axial direction without passing through the filter 15 is prevented by the closing disk 31.

Regeneration of the Filter

After some time, the filter material 15 will be loaded with soot. The flow resistance of the filter will increase. Electrical energy is then connected to the terminal bolts 21, 25 from an external current source, not shown. A current will flow through the sheet-metal element 13, perforated by the holes 16, between one of the unperforated end regions 17 and the other unperforated end region 18. The central region of the tube 13 where the openings 16 are formed will have a substantially smaller cross section than the unperforated end portions 17, 18, and this central region will heat substantially due to the current flow. The portions of the tube 13 between the holes 16, that is, the intervening ribs and metallic paths, forming meander paths, will heat. A suitable energy supply heats these regions of the tube 13 to about 1300° C. At the same time, the heat is transferred to the heat reservoir and heat transfer structure 14 due to thermal contact with the tube 13. The surface which is heated will be substantial. This heat is transferred to the gas flowing into the filter in the direction of the arrow 39. Consequently, the gas, after leaving the heat transfer arrangement 14, will have a temperature which is so high that any oxygen within the gas flow can react with the soot or carbon or other combustible particles retained within the filter material 15. Temperatures of 1300° C. are adequate to effect combustion of carbon particles so that the soot will burn to carbon dioxide, which leaves the filter 1 through the outlet 42. The filter 1, thus, is effectively self-cleaned by having the contaminating particles burned off. As soon as the particles are removed from the filter material 15, the external current supply is interrupted so that the gases passing through the filter will cool the filter to its normal operating temperature.

The heat transfer and heat reservoir arrangement 14 ensures that the gases which pass through the material 14 and come in contact with the material 14 have the necessary excess temperature to provide for combustion of particles in the filter 15. If this heat transfer and heat reservoir material were not provided, the electrical resistance heater 13 would have to be heated to substantially higher temperatures so that the gases passing the heater 13 will reach the required temperature. Small variations in the flow rate of the gases might well lead to excess heating of the resistance heating device 13–16 which is endangered thereby. The heat reservoir and heat transfer structure or material 14 ensures a substantially increased surface in contact with the gases over that of the heating element 13, so that the resistance heating element 13 can operate at lower temperatures, without endangering the structure integrity of the heater 13. Additionally, the heat reservoir and heat transfer structure, which may also be termed a heat exchange material, is capable of accepting and storing excess heat for a limited period of time if the flow rate should temporarily drop.

The heat transfer arrangement or heat reservoir substance 14, formed as a flat textile structure, does not essentially inhibit gas flow and also has some filtering effect.

FIG. 1 illustrates the filter in a form in which the heat reservoir substance or heat transfer or heat exchange substance 14 is located at the outside, surrounding the resistance heater 13–16. It is also possible to change the relative position.

Figure 2:
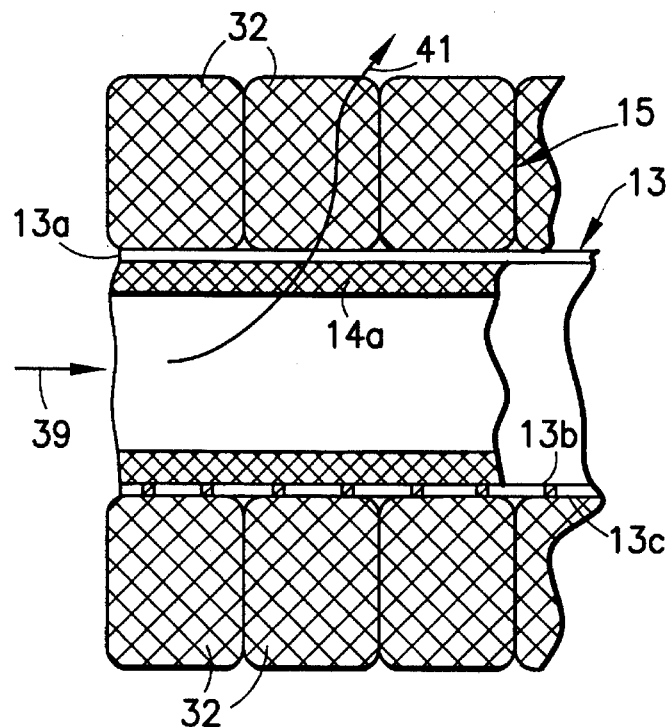
FIG. 2 is a fragmentary cross-sectional view of the heating element, the heat retention or heat reservoir structure.

FIG. 2 illustrates, in fragmentary and highly schematic form, an arrangement in which the filter material 15 surrounds the resistance heater—support structure 13–16, whereas the heat reservoir or heat transfer structure 14a is located within the resistance heater 13–16. In this embodiment, it is preferred to use a knitted fabric structure for the reservoir substance 14a in order to ensure good thermal contact with the resistance heater 13–16 due to the inherent elasticity of the knitted mesh arrangement.

Figure 3:
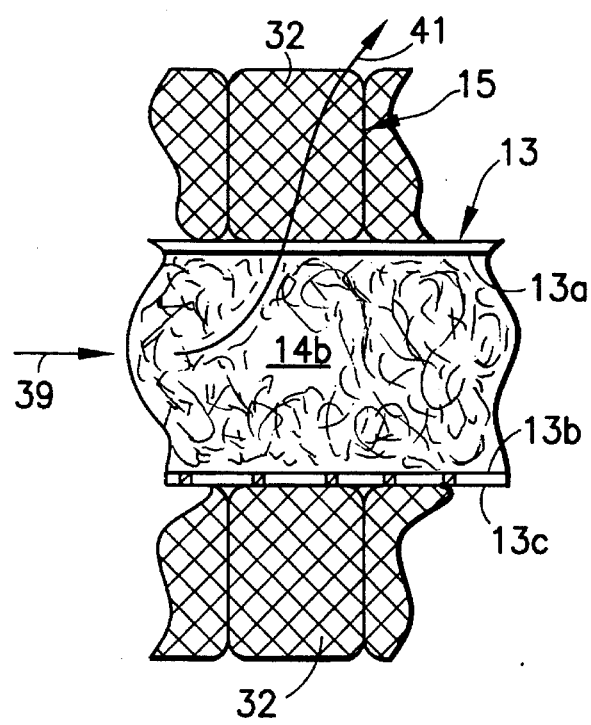
FIG. 3 is a view similar to FIG. 2 illustrating another embodiment.

FIG. 3 illustrates, in fragmentary form, an alternate arrangement in which the heat reservoir structure or heat transfer structure or substance 14b is formed as a wire wool, in order to obtain the same effect. The arrangement in accordance with FIG. 3, at equal heat transfer capacity, does have a higher flow resistance to the gases, however, than the arrangements shown in FIGS. 1 and 2.

The invention has been described in connection with a soot filter for exhaust gases from Diesel engines; as can be clearly seen, the structure in accordance with the invention is equally suitable for other uses, in which particles to be filtered from a gaseous carrier by the filter material 15 are combustible, and in which the combustible material is removed by burning it off the filter material. Any other type of material in which a temperature increase can remove particles from a filter can be passed through the filter in accordance with the present invention which, then, can be regenerated by applying electrical energy to the terminal bolts 21, 25.

Electrical insulation of the electrical resistance heater 13–16 with respect to the filter material, which may include electrically conductive metal filaments or the like, and/or the heat reservoir substance 14, 14a, 14b, is most easily effected by coating the heater 13–16 with a thin layer of ceramic or oxide insulation, having a thickness of between about 0.01 to 0.1 mm. Such materials can readily be formed on a sheet-metal element; ceramic and other oxides can be sprayed, or oxidation layers formed in accordance with well-known technology.

For purposes, merely, of heat transfer, it does not matter whether the heat reservoir substance 14, with respect to the flow direction of the gas, is in advance of the resistance heater 13–16 or behind the resistance heater 13–16. The selection of location will depend, essentially, on ease of production of the filter cartridge. The important feature is the thermal contact between the resistance heater element 13–16 and the heat transfer or heat reservoir substance 14, 14a, 14b, since the heat reservoir or heat transfer substance 14 substantially increases the area available for contact with the gas stream to heat the gas stream. The wire mesh of the heat reservoir substance is used to increase the surface as well as the path length of gas which is subject to being heated. Looked at from the electrical resistance heater 13–16, it does not matter if the heat reservoir and heat transfer substance 14 is located at the outside or at the inside of the electrical resistance heater tube 13 since, in both instances, the heat reservoir and heat transfer substance 14 transmits heat from the electrical resistance heater 13–16 on the gas stream flowing past and through the heat reservoir substance 14.

Regarding the second aspect of the present invention, namely prevention of overheating of the heat reservoir substance upon decreased quantity of gas flowing through the reservoir substance, it does not matter either on which side of the electrical resistance heater 13–16 the heat reservoir substance 14 is located. It is only important that the heat reservoir and transfer substance 14 has good heat exchange contact with the electrical resistance heater 13–16.

Various changes and modifications may be made, and any features described herein may be used with any of the others, within the scope of the inventive concept.

I claim:

1. Regeneratable filter for combustible solid particles within a gas stream, having a housing (2) having a gas stream inlet (7) and a gas stream outlet (8);

a filter medium support (13) located in the housing (2);

gas pervious, high temperature resistant filter material (15) supported on said filter medium support (13);

an electrical resistance heater (13–16) located in the housing and positioned, with respect to the flow direction of the gas stream through the filter, upstream of said filter material (15), and comprising, in accordance with the invention, a heat transfer material (14) located in the housing, and having, inherently, limited thermal inertia, said heat transfer material being located in physical heat transfer contact with the electrical resistance heater (13–16), to increase the effective heat transfer surface of the electrical resistance heater to the gas stream and affect heat transfer from said heater to the gas stream without essentially inhibiting gas flow;

said heat transfer material having a surface in contact with the gas which is substantially larger than the surface of the electrical resistance heater; and said heat transfer material (14) being positioned, with respect to the flow direction of the gas stream through the filter, upstream of said filter material (15), and thermally exposed to said gas stream for heat exchange with the gas stream.

2. The filter of claim 1, wherein said filter medium support (13), simultaneously, forms said electrical resistance heater (13–16).

3. The filter of claim 1, wherein said electrical resistance heater (13–16) is electrically insulated from said heat transfer material (14).

4. The filter of claim 1, wherein said electrical resistance heater (13–16) comprises a tubular sheet-metal structure, thermally coupled to the heat transfer material (14), and a plurality of holes (16) formed in said structure to reduce the cross-sectional area of said tubular structure and increase the electrical resistance thereof.

5. The filter of claim 4, wherein the tubular sheet-metal structure forming the resistance heater (13–16) has axial end portions (13a) which are insulated from each other.

6. The filter of claim 5, wherein said end portions (13a) are spaced from each other by a gap.

7. The filter of claim 1, wherein said heat transfer material is located between the electrical resistance heater (13–16) and said filter material (15).

8. The filter of claim 1, wherein, with respect to the flow direction of the gas stream through the filter, said heat transfer material (14) is located in advance of said electrical resistance heater (13–16).

9. The filter of claim 1, wherein said heat transfer material (14) comprises a fibrous or filamentary body which is formed of essentially flat textile material.

10. The filter of claim 9, wherein said electrical resistance heater (13–16) is a hollow tubular structure, and said heat transfer material (14) loosely fills the interior of said hollow structure.

11. The filter of claim 1, wherein said transfer material substance (14) comprises a textile body of good heat conductive and high heat resistant filaments or fibers.

12. The filter of claim 11, wherein said filaments or fibers are wire filaments or fibers.

13. The filter of claim 11, wherein said textile material body comprises a woven structure.

14. The filter of claim 11, wherein said textile material body comprises a knitted structure.

15. The filter of claim 1, wherein said heat transfer material (14) comprises wire wool.

16. The filter of claim 15, wherein said wire wool is a substantially flat body formed as felted material.

17. The filter of claim 1, wherein said electrical resistance heater (13–16) is a hollow tubular structure and said heat transfer material (14a) is formed as a layer, lining the interior, in circumferential direction, of said tubular structure.

18. The filter of claim 1, wherein the electrical resistance heater (13–16) is a hollow tubular structure and said heat transfer material (14) is wound about the tubular structure in form of a wound layer.

19. The filter of claim 1, wherein said filter material (15) comprises a plurality of portions (32) of filter material structure in the form of textile material.

20. The filter of claim 19, wherein said portions of textile material structure are rolled in ring form (32); and wherein a plurality of such ring-formed rolls are located, axially next to each other, about the electrical resistance heater (13–16).

21. The filter of claim 1, further including a filter holder (33) located within the housing (2), said filter holder surrounding the filter material (15), and having a gas-pervious wall.

22. The filter of claim 21, further including end walls (37) engaging end portions of the filter material (15), and forming, with the filter holder (33), the resistance heater (13–16) and the heat transfer material (14), a filter cartridge.

23. The filter of claim 1, wherein said filter material (15) comprises, at least in part, at least one of fibers, or filaments of good heat conductive material, or wire.

24. The filter of claim 1, wherein said filter comprises a soot filter for exhaust gases from a Diesel engine, and said gas stream inlet (7) includes means for coupling the filter to the exhaust from a Diesel engine.

* * * * *